P. DONOFRIO.
PASTRY BAKING MACHINE.
APPLICATION FILED SEPT. 7, 1915.
1,188,917.
Patented June 27, 1916.
3 SHEETS—SHEET 2.
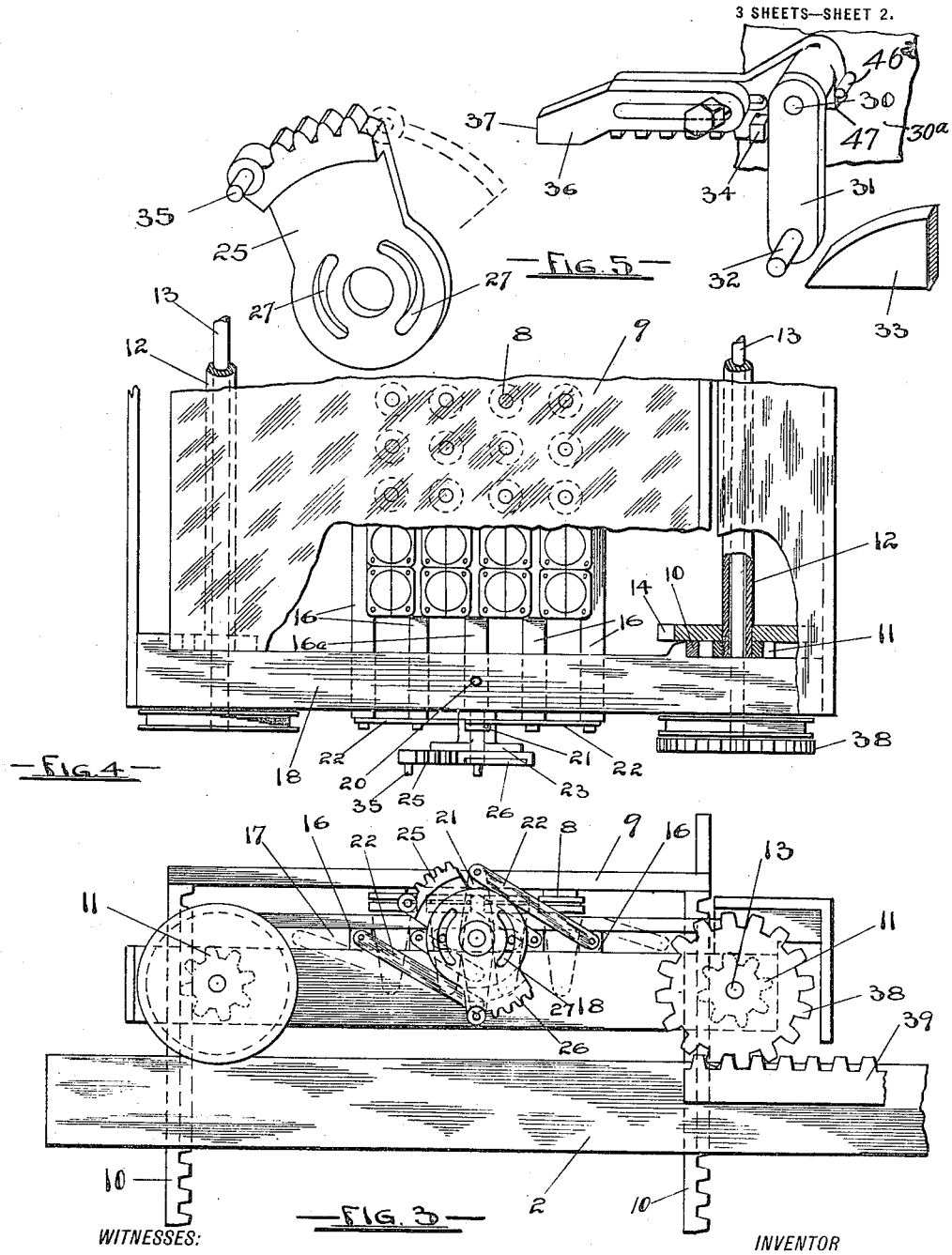
WITNESSES:
INVENTOR
PATSY DONOFRIO
BY
C. F. Blake
ATTORNEY

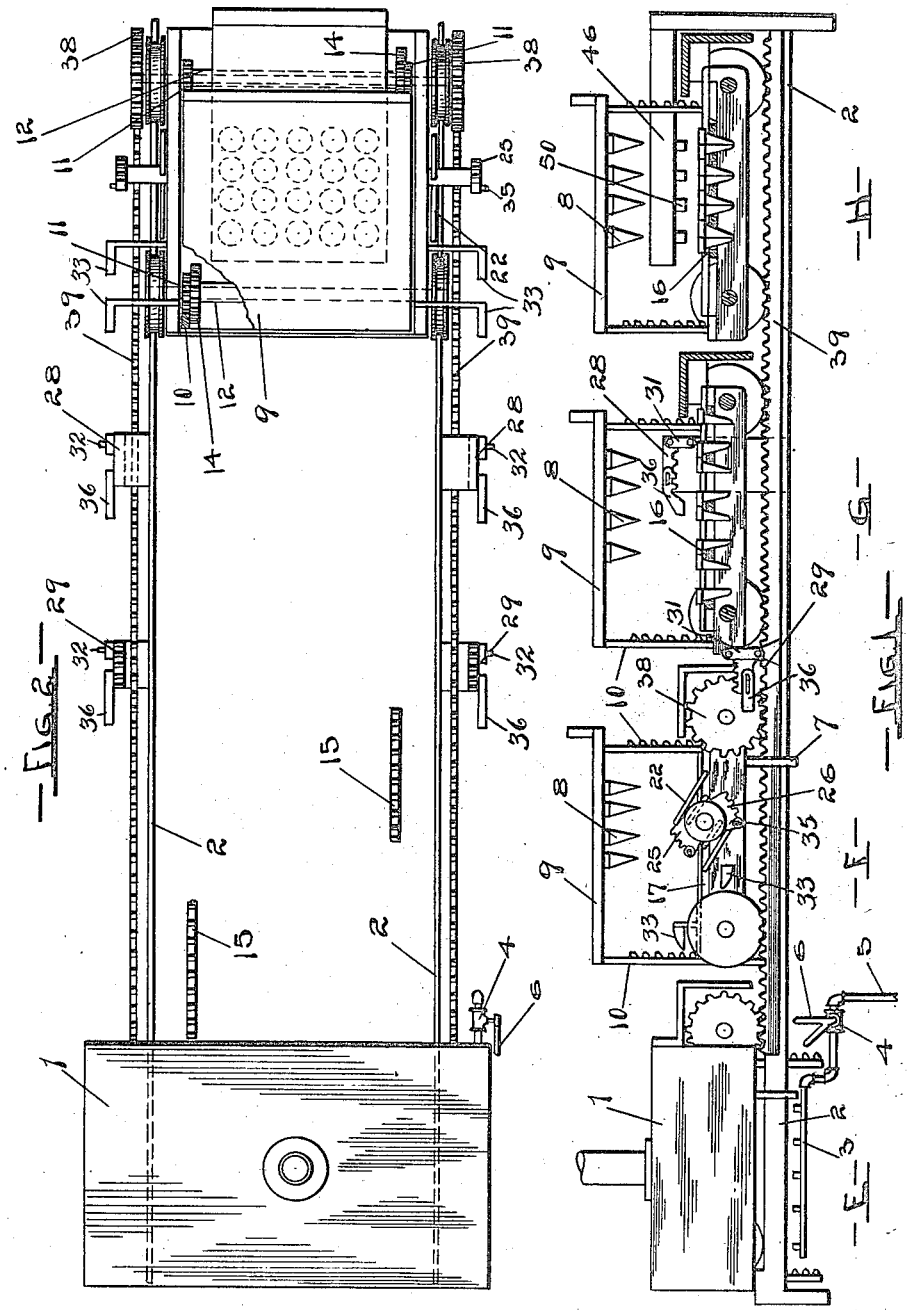

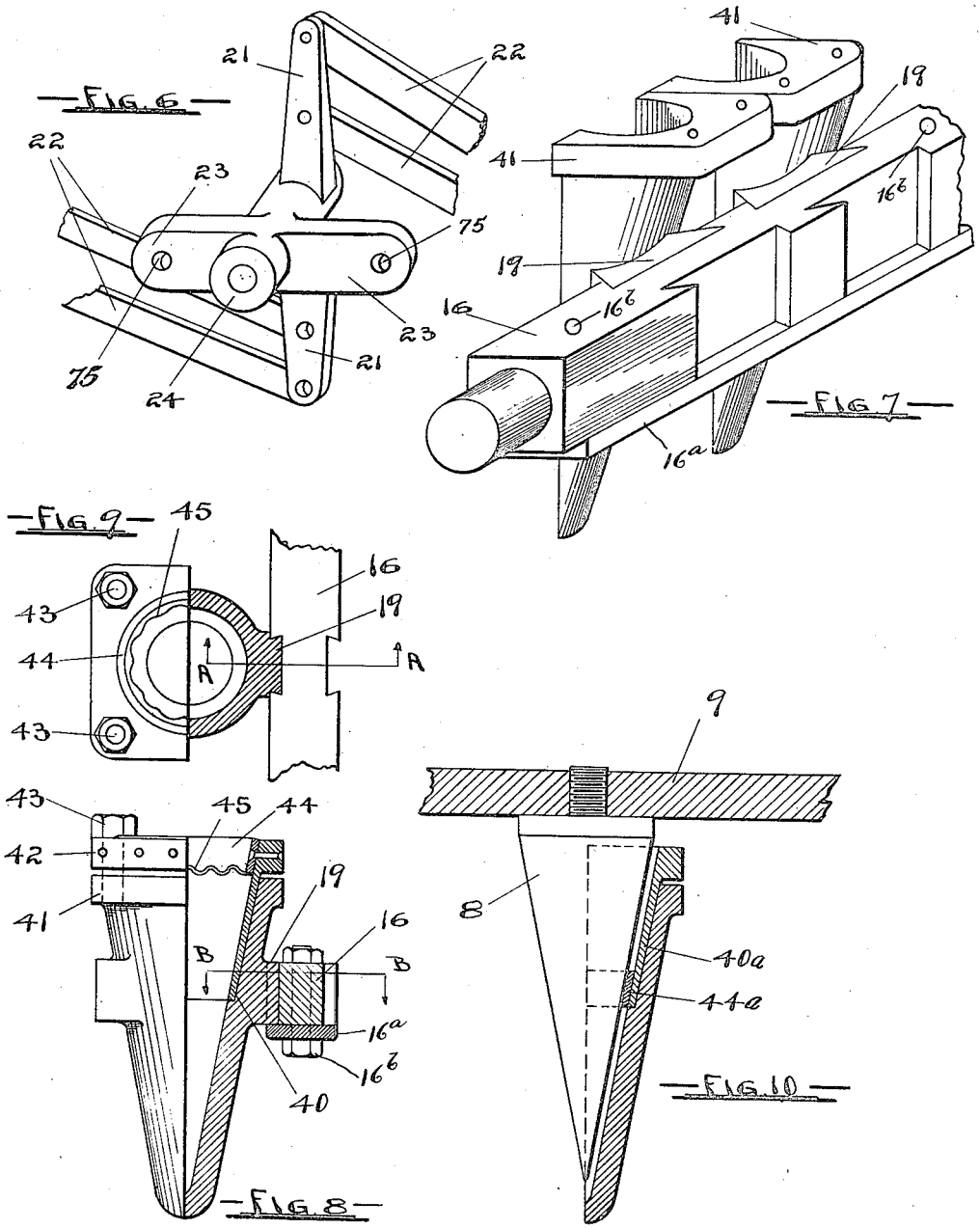

UNITED STATES PATENT OFFICE.

PATSY DONOFRIO, OF PORTLAND, OREGON.

PASTRY-BAKING MACHINE.

1,188,917. Specification of Letters Patent. Patented June 27, 1916.

Application filed September 7, 1915. Serial No. 49,307.

*To all whom it may concern:*

Be it known that I, PATSY DONOFRIO, a citizen of the United States, residing at Portland, county of Multnomah, State of Oregon, have invented certain new and useful Improvements in Pastry-Baking Machines, of which the following is a specification.

My invention relates to pastry baking machines in general, and particularly to that class of such machines adapted to the manufacture of ice cream cones.

The objects of my invention are to provide adjustable forms for making cones of various sizes; to provide a form for making an ornamental top to the cone; and to provide a machine that shall be economical in use, simple in construction, and cheap to manufacture.

I attain the above objects by means of the construction illustrated in the accompanying drawings, which therefore are a part of this application for Letters Patent, and in which:—

Figure 1 is a diagrammatical side elevation of my invention; showing the carriage in the various positions of operation. Fig. 2 is a plan view of Fig. 1. Fig. 3 is a side elevation of the carriage. Fig. 4 is a plan view of Fig. 3. Fig. 5 is a collective perspective view of the device for opening and closing the female forms. Fig. 6 is a perspective view of the spider which operates in conjunction with the mechanism of Fig. 5. Fig. 7 is a perspective view of one of the bars supporting the female forms, showing two of said forms in place thereon. Fig. 8 is a view of a pair of coöperating female forms, one being shown in side elevation and one in longitudinal vertical section on line A—A, of Fig. 9. Fig. 9 is a plan view of Fig. 8, one form being shown in section on line B—B, of Fig. 8. Fig. 10 is an elevation of the male form, showing one of the female forms in longitudinal sections adjacent thereto, and illustrating the adjustable device for making small cones.

Like characters of reference indicate like parts throughout the several views of the drawings.

The general character and construction of my invention may be understood by reference to Fig. 1, and is in general the provision of an oven heated by any convenient means into which may be propelled a car upon tracks, said car conveying the dough filled forms to be baked; and a covered dough pan at the end of the carriage tracks exterior to said oven, and adapted to fill the forms with dough when the carriage is propelled beneath the dough pan. In this view (Fig. 1) the carriage is shown at its several stages of operation as follows: At E the carriage is in the oven and the cones are baking; at F the carriage, with the baked cones has been withdrawn from the oven and the male forms raised out of the female forms, leaving the baked cones in the latter; at G the female forms have opened to discharge the baked cones; at H the female forms have closed and the carriage has been placed beneath the dough pan to receive the dough charges into the female forms. When said dough charges have been received, the carriage is propelled back into the oven for baking, and as the carriage passes position F, the male forms are lowered into the female forms, this causing the dough charges therein to exactly fill the space intermediate said male forms and said female forms.

The oven 1 is located at one end of the track 2, and immediately above said tracks, and gas burners 3 are provided beneath said oven. A valve 4 is provided upon the gas supply pipe 5, said valve having levers 6 adapted to contact with tappet bar 7 carried upon the carriage, for the purpose of turning down the gas when the carriage is withdrawn from the oven and turning the gas on again when the carriage is returned to the oven, by which means an economy of gas is effected. The male cones 8 are secured to a plate 9, which plate is supported at each corner thereof by a toothed rack bar 10, each of said rack bars sliding in guides upon the carriage frame adjacent thereto, and engaging with toothed pinions 11, mounted in pairs upon sleeves 12, which are carried upon the axles 13 of the carriage, as shown in Figs. 3 and 4. Upon the right hand end of one of said sleeves 12, and upon the left hand end of the other sleeve, adjacent said pinion 11, and rack 10, there is mounted a gear 14, said gear 14 and pinions 11 being secured to the sleeve 12 so as to rotate therewith as a unit. The rotation of said sleeves 12 with pinions 11 simultaneously raises the racks 10 and thus the male forms are removed from the female forms, and are raised sufficiently to pass above the dough pan when the carriage is brought beneath same to receive the dough, as shown at H in Fig. 1.

To cause the operation of the mechanism described above for raising the male forms, two racks 15 are provided, intermediate the tracks 2 and adjacent the oven 1, said racks being so disposed as to simultaneously engage and simultaneously release the gears 14 as the carriage travels along the tracks. The female forms are mounted in the carriage by means of cross bars 16, the ends of which slide in guides or grooves 17 in the carriage sides 18. A series of individual female forms are secured to each cross bar by means of dove-tailed connections thereto, as shown at 19 in Figs. 7, 8 and 9, there being a series of female forms thus secured upon each side of each cross bar, each such series co-acting with the adjacent series upon the adjacent cross-bar, as shown at G. and H. in Fig. 1 and in Fig. 4.

For the purpose of securing the dove-tailed lugs 19 of the semi-female forms within their respective apertures in the cross bars 16, each of said cross bars is provided upon the lower face thereof with a bar 16$^a$, said bars being secured to their respective cross bars by bolts 16$^b$, as shown in Figs. 7 and 8, thus providing a rest for the lugs 19 and securing same from passing entirely through their respective apertures.

The opening and closing of the female forms is accomplished by moving the cross bars 16 in the guides 17, as shown at G. and H. in Fig. 1, and the mechanism operating said cross bars is as follows: The central cross bar, 16$^A$, is secured to the carriage sides by means of bolts or pins 20, and upon each end of cross bar 16$^A$ is rotatably mounted a spider, shown in detail in Fig. 6. Said spider has two arms 21 to which are pivotally connected links 22, the opposite end of each of said links being pivotally connected to the end of one of the cross bars 16, as shown at F. in Fig. 1, and in Figs. 3 and 4. Said spider also has arms 23, and a projecting limb 24, adjacent arms 23, as shown in Fig. 6.

Rotatably mounted upon hub 24 is a pair of toothed segments 25 and 26 as shown at F in Fig. 1, and in Figs. 3 and 5. Said segments are made relatively adjustable about hub 24 by means of slots 27 adapted to receive bolts secured in orifices 75 of arms 23, as shown in Fig. 3. By means of links 22, and spider arms 21 and 23 the turning of said segments 25 and 26 clockwise spreads cross bars 16 and thus opens the female forms attached to adjacent cross bars, as shown at G. in Fig. 1, and the turning of said segments counter-clock-wise closes said cross bars, and the female forms attached thereto, as shown at H. in Fig. 1, and in Figs. 3 and 4.

To operate segments 25 and 26 racks 28 and 29 adapted to engage respectively said segments, are placed in the path traversed by said segments as the carriage travels along the tracks, as shown diagrammatically in Fig. 1. As the carriage travels toward the dough pan racks 29 engage segments 26 causing same to rotate upon the central cross bar 16$^A$, and thus to open the female forms for discharging the baked cones, as shown at G. in Fig. 1. After the baked cones are discharged, a further movement of the carriage toward the dough pan causes racks 28 to engage segments 25, thereby closing the female forms before they pass beneath the dough pan to receive the dough charges, as shown at H. in Fig. 1.

As the carriage travels toward the oven after receiving the dough charges it is necessary to remove the racks 28 and 29 from the paths of travel of segments 25 and 26, and while this may be accomplished by means of any convenient ratchet mechanism, I have illustrated such a means in Fig. 5. In Fig. 5 the rack is shown pivotally mounted upon a pin 30, secured to a support 30$^a$, and an arm 31 is also pivotally mounted upon pin 30, said arm having a pin 32 in the end thereof, said pin 32 being adapted to contact with a cam 33 carried upon the carriage. To maintain said racks 28 and 29 in a horizontal position wherein they may be engaged by their respective segments 25 and 26 as said segments pass beneath said racks, a pin 46$^a$ is secured to the support 30$^a$ adapted to contact with a heel or toe 47 upon the hub of the rack, and thus support said rack in a horizontal position, as shown in Fig. 5. When the carriage moves toward the oven cam 33 contacts with pin 32 and causes arm 31 to rotate clockwise upon pin 30, and thus arm 31 by contacting with lug 34 upon the rack lifts the rack about pin 30 out of the path of the respective segment 25. Movement of the carriage toward the dough pan simply swings arm 31 about pin 30, causing the arm 31 to leave lug 34 and thus the location of the rack is not affected, and contact of the rack with the teeth of the segment is assured. Any slight inaccuracy of operation of the carriage or of setting in the machinery may result in the end tooth of the racks 28 or 29 contacting with the corresponding tooth upon their respective quadrants inaccurately, or in such a manner that the teeth of the quadrants do not slide easily and smoothly into proper mesh with the teeth of the racks.

In order that the teeth of the rack and the teeth of the segment may always mesh properly a pin 35 is provided in the segment, and a contact piece 36 is slidably mounted upon the rack, the end face 37 of which is adapted to contact with pin 35 thus starting the rotation of the quadrant slightly in advance of the contact of the first teeth upon the quadrant and the rack, and thus causing said teeth to come smoothly into proper mesh. Adjustment of said contact piece upon the rack may be made so that the teeth of the rack and the teeth of the segment will mesh properly as they approach. A similar construction is adopted for the segments 26 and their racks 29.

In order to keep the carriage square upon the tracks 2, a pair of gears 38 are secured to the ends of one of the carriage axles, and these gears mesh with racks 39 secured upon the outer face of each track.

In order to vary the size of the cones, I provide in the upper end of each female form a truncated, conical, flanged member 40, the inside surface of said member 40 being flush with the inside surface of the female form as shown in Figs. 8 and 9.

The female form is provided with a flange 41, and the member 40 with a similar flange 42, said flanges being connected by bolts 43 which thus serve to confine member 40 within its respective female form, as shown in Fig. 8.

The half portion of an annular ring 44 of a thickness exactly equal to the space between the male form and the female form is secured to member 40, and the lower edge of said ring 44 is fluted as shown at 45 in Fig. 8 for the purpose of molding the large end of the baked cone into an ornamental shape.

Any desired and suitable shape may be given to the edge 45 of ring 44, or said ring may be left perfectly plain.

By having a substitute member 40<sup>A</sup> adapted to replace member 40 when desired, and by having attached to the lower end of said member 40<sup>A</sup> the half portion of an annular ring 44<sup>A</sup> similar to ring 44, the upper end of the baked cone will be limited in the form by said ring 44<sup>A</sup>, and thus the size of the baked cone may be altered as desired by removing portion 40 with ring 44 attached thereto, and substituting therefor portion 40<sup>A</sup> with ring 44<sup>A</sup> attached thereto.

It is obvious that by means of this device as many various sizes of cones as desired may be manufactured simultaneously in the same machine.

My invention may be made of any size and constructed of any materials deemed convenient and suitable in a device of this character, and while I have illustrated and described a preferred form of construction and arrangement of parts found desirable in materializing my invention I wish to include in this application for Letters Patent all mechanical equivalents or substitutes that may fairly be considered to come within the scope and purview of my invention as defined by the appended claims.

Having thus disclosed my invention, what I claim is:—

1. In a pastry baking machine having an oven, tracks entering said oven, and a dough receptacle adjacent said tracks; a reciprocating carriage comprising wheels and axles adapted to operate upon said tracks; housings mounted upon said axles, and having longitudinal guides therein; a central cross bar transversely disposed between said housings, each end thereof coacting with said guides and being centrally secured therein; a plurality of cross bars symmetrically disposed relative to said central cross bar, and each coacting with said guides, and being slidably mounted therein; a plurality of semi female forms mounted upon each of said cross bars, each of said forms coacting with the corresponding form upon the adjacent cross bar to complete an entire female form; means for securing each of said semi female forms to its respective cross bar individually; a plurality of male forms reciprocatingly mounted above said semi female forms and adapted to enter the completed female forms; means to vertically reciprocate said male forms; means to horizontally reciprocate said symmetrically disposed cross bars and the semi female forms secured thereto.

2. In a pastry baking machine having an oven, tracks entering said oven, and a dough receptacle adjacent said tracks; a reciprocating carriage comprising wheels and axles adapted to operate upon said tracks; housings mounted upon said axles, and having longitudinal guides therein; a central cross bar transversely disposed between said housings, each end thereof co-acting with said guides, and being centrally secured therein; extensions upon each end of said central cross bar; a plurality of cross bars symmetrically disposed relative to said central cross bar, and each coacting with said guides, and being slidably mounted therein; a plurality of semi female forms mounted upon each of said cross bars, each of said forms coacting with the corresponding form upon the adjacent cross bar to complete an entire female form; means for securing each of said semi female forms to its respective cross bar individually; a duality of relatively adjustable segments pivotally mounted upon said extensions at each end of the central cross bar; means to rotatably adjust said segments relatively one to another; a plurality of links each pivotally connecting said segments to the end of one of said symmetrically disposed cross bars; means for operating said segments as the carriage traverses said tracks; a vertically reciprocating member immediately above said female forms; a plurality of male forms secured to said vertically reciprocating member, and adapted to enter said completed female forms; a plurality of toothed supports for said vertically reciprocating member; gears upon said axles adapted to engage said toothed supports; and racks intermediate said tracks to operate said gears as the carriage traverses said tracks.

3. In a pastry baking machine comprising an oven, a reciprocating carriage adapted to enter and leave said oven, and vertically reciprocating male forms mounted upon said carriage; a plurality of horizontally reciprocating transversely disposed cross bars having apertures therein; a plurality of semi female forms each having a lug adapted to engage with one of said apertures; and means to secure said lugs within said apertures.

4. In an ice cream cone baking machine, a female baking form, a male baking form, and means within said female form to vary the size of the cone manufactured.

5. In an ice cream cone baking machine, a female baking form, a male baking form, a flanged truncated conical member adapted to enter said female baking form, means to secure said member within said female form, and an annular ring attached to said member and adapted to regulate the size of the cone manufactured.

6. In an ice cream cone baking machine, a female baking form, a male baking form, an annular ring secured within said female form adapted to surround said male form, said ring having a serrated lower edge for the purpose of imparting an ornamental design to the top edge of the manufactured cone.

7. In a pastry baking machine comprising an oven, a reciprocating carriage adapted to enter and leave said oven, and vertically reciprocating male forms mounted upon said carriage; a plurality of horizontally reciprocating transversely disposed cross bars having dovetailed apertures therein; a plurality of semi female forms each having a dovetailed lug adapted to engage with one of said dovetailed apertures; a clamp bar longitudinally disposed upon the lower surface of each of said cross bars; and means to secure said clamp bars to their respective cross bars.

8. In a pastry baking machine comprising an oven, a reciprocating carriage adapted to enter and leave said oven, and vertically reciprocating male forms mounted upon said carriage; a plurality of horizontally reciprocating transversely disposed cross bars; a plurality of semi female forms; and means for individually securing each of said semi female forms to one of said cross bars.

In witness whereof, I claim the foregoing as my own I hereunto attach my signature in the presence of two subscribing witnesses.

PATSY DONOFRIO.

Witnesses:
L. J. ROBINSON,
C. S. BROWN.